United States Patent [19]

Yamaguchi et al.

[11] Patent Number: 4,709,271

[45] Date of Patent: Nov. 24, 1987

[54] CRT MULTIFORMAT CAMERA

[75] Inventors: Keiki Yamaguchi; Shozo Tomita, both of Tokyo, Japan

[73] Assignee: Yokogawa Medical Systems, Limited, Tokyo, Japan

[21] Appl. No.: 865,192

[22] PCT Filed: Sep. 14, 1985

[86] PCT No.: PCT/JP85/00517

§ 371 Date: Apr. 30, 1986

§ 102(e) Date: Apr. 30, 1986

[87] PCT Pub. No.: WO86/01912

PCT Pub. Date: Mar. 27, 1986

[30] Foreign Application Priority Data

Sep. 17, 1984 [JP] Japan .................... 59-194246

[51] Int. Cl.$^4$ .......................................... H04N 5/84
[52] U.S. Cl. .................... 358/244; 346/107 R; 355/68
[58] Field of Search ............ 358/244, 244.1, 244.2, 358/345, 332; 369/101, 125; 355/68; 346/107 R, 110 R

[56] References Cited

U.S. PATENT DOCUMENTS

| 4,093,375 | 6/1978 | Griesch et al. ................ 355/68 |
| 4,206,465 | 6/1980 | Tamoto et al. ............. 346/107 R |
| 4,264,196 | 4/1981 | von Stein et al. ................ 355/41 |
| 4,278,347 | 7/1981 | Okamoto et al. ................ 358/244 |
| 4,319,281 | 3/1982 | Gall et al. ............................ 358/244 |
| 4,627,004 | 12/1986 | Cool et al. ........................ 358/244 |

FOREIGN PATENT DOCUMENTS

| 50-33657 | 11/1975 | Japan . |
| 51-135648 | 11/1976 | Japan . |
| 53-107818 | 9/1978 | Japan . |
| 54-76153 | 6/1979 | Japan . |
| 56-74238 | 6/1981 | Japan . |
| 54-88447 | 6/1982 | Japan . |

Primary Examiner—Donald McElheny, Jr.
Attorney, Agent, or Firm—Moonray Kojima

[57] ABSTRACT

The present invention relates to a CRT multiformat camera which photographs CRT images onto photographic media of either film or photoprint in photographic conditions automatically set according to a selected photographic media type and has a feature of including photographing media discriminator (1) which discriminates between photographic media, and photographing condition setting device (4) which sets photographic conditions to the camera and/or the CRT display unit according to the discriminating signal of said photographing media discriminator.

5 Claims, 3 Drawing Figures

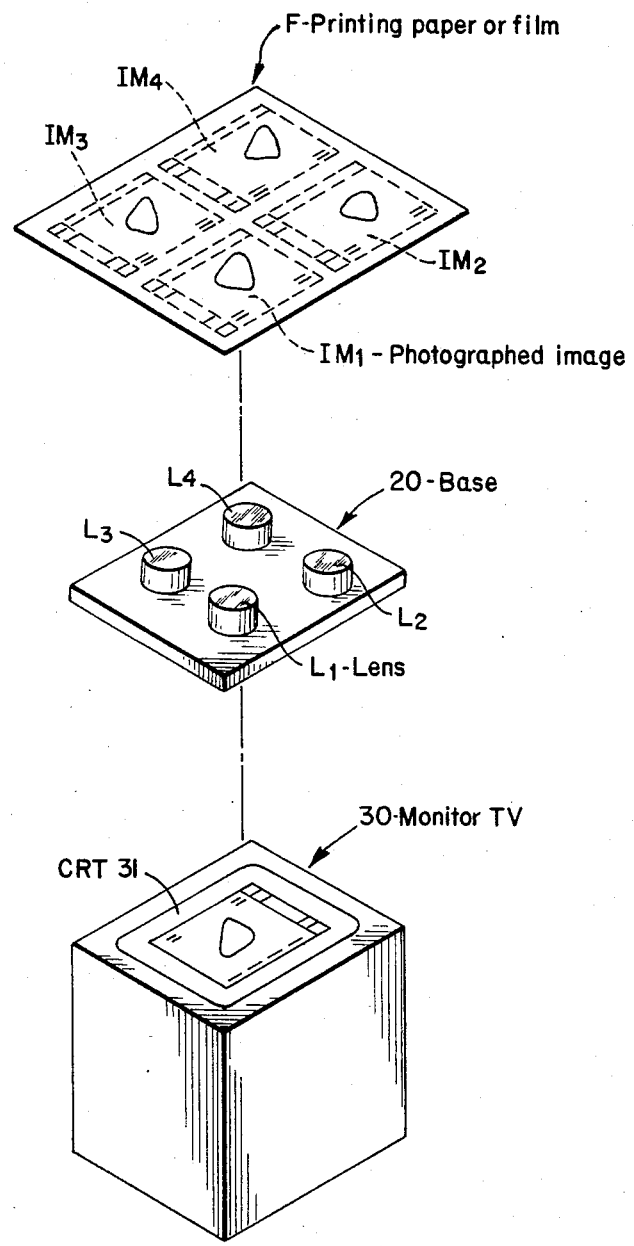

CRT MULTIFORMAT CAMERA

TECHNICAL FIELD

This invention relates to a CRT multiformat camera for photographing CRT images on CT (Computer Tomography) and ultrasound scanners.

BACKGROUND ART

A conventional camera for photographing CT and ultrasound scanner images called a "multiformat camera" photographs CRT images exposed on ortho-type medical imaging film. In the case of this film, its photographic images are viewed via transmitted light, requring a film hanging device with built-in fluorscent lamps called a "film viewing box". It is customary at any hospital to view the film while hanging it in the film viewing box. Therefore, inconvenience may be felt if there is no said box available near at hand. As an alternative, a Polaroid camera is widely used for photographing CRT images which are also easily developed. No film viewing box is required for viewing photographs taken by the Polaroid camera, becuase it uses reflected light images. However, the cost per image is high and photograph filing is very troublesome due to the one photograph per sheet format when compared with transmitted light photographs taken by said multiformat camera. Further, paper scraps are produced every time one photograph is developed. In order to remove this inconvenience, a multiformat camera for use with both film and photoprint has been invented. However, the large exposure sensitivity difference between film and photoprint requires the setting of appropriate independent photographic condtions. With conventional multiformat camera, the photographer must select the photographic conditions appropriate to the film or photoprint being used, which may cause a photographic failure due to incorrect choice of media and/or failure to select the appropriate photographic conditions.

DISCLOSURE OF INVENTION

The present invention solves the aforementioned technical problems relating to CRT multiformat cameras by enabling multiformat photography using transmitted light images onto conventional medical imaging film as well as reflected light images onto photoprint, thereby eliminating the need for a film viewing box through automatic selection of photographic conditions appropriate to the media used.

A feature of this invention to solve the above problems is that said CRT multiformat camera includes a photographing media discriminator which discriminates between photoprint and film and outputs a discriminating signal, and a photographing condition setting device which sets the photographic conditions appropriate to photographic media to the CRT camera according to the output signal of said photographing media discrimanator.

BRIEF DESCRIPTION OF DRAWINGS

FIG. 3 is a conceptual diagram of the camera.

BEST MODE FOR CARRYING OUT THE INVENTION

Following is the detailed discription of one embodiment in this invention with reference to drawings.

Figure 1:
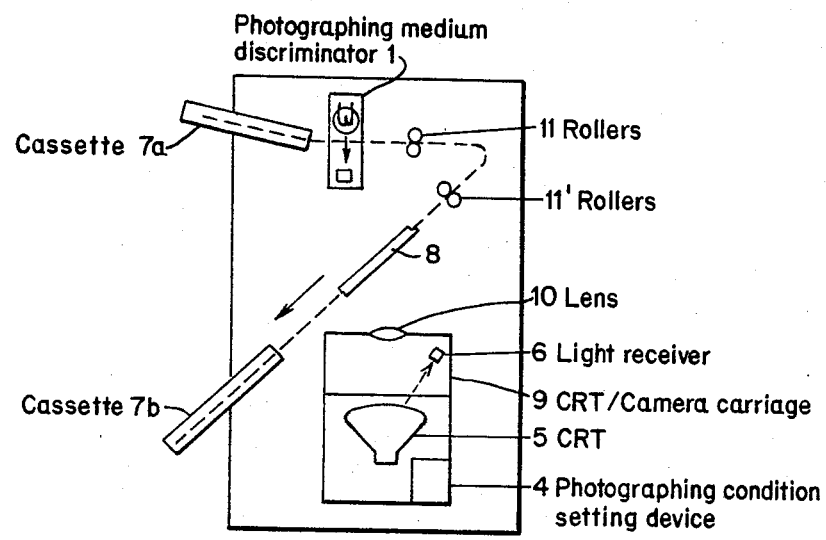
FIG. 1 illustrates a simplified configuration diagram of said CRT multiformat camera embodied in this invention.
Figure 2:
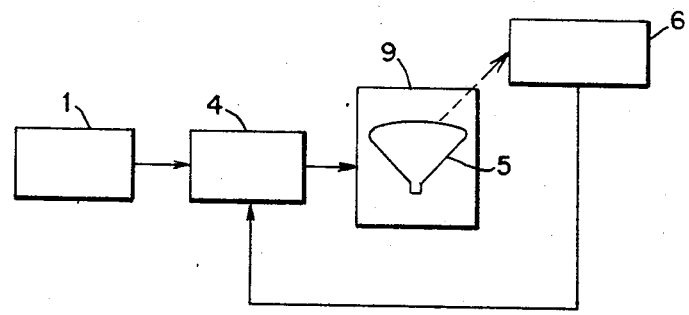
FIG. 2 illustrates a block diagram of the camera's control system.

FIG. 3 illustrates a conceptual diagram in which a camera is used to photograph four (4) frames on one photoprint or film. In this figure, a medical image projected on monitor television (hereinafter abbreviated to TV) 30 is exposed onto what is generally black-and-white photoprint or film F through lenses L1 to L4 installed on base 20. Photographic conditions such as brightness of CRT 31 on monitor TV 30 and shutter speed to shut off transmitted light through each lens, (described in detail later), are set to those in which a good gradient of light and shade is achieved so as to match photoprint—or film—sensitivity and automatic processor characteristics, whereupon images IM1 to IM4 projected one by one on the CRT are photographed on one print or film F using sequential shutter control. In this case, photographs are taken with the relative positions of the CRT image, lenses and photoprint or film being fixed. FIG. 1 illustrates a simplified configuration diagram of the CRT multiformat camera embodied in this invention, while FIG. 2, a block diagram of the associated control system. In these figures, 1 is a photographing media discriminator such as, for example, a photo-interrupter; 4, a photographing condition setting device; 5, a CRT; 6, a light receiver; 7, a photoprint or film casette; 8, a photoprint or film storing guide; 9, a CRT/camera carriage; 10, a camera lens; and 11, feed rollers.

A photoprint or film is fed from supply cassette 7a and is sequentially positioned by rollers 11, for example, at three (3) different positions in the horizontal section shown by the broken line. For each of these positions, CRT/camera carriage 9 is sequentially positioned, for example, at three (3) different positions at right angles to the sheet surface on which FIG. 1 is drawn, thus enabling photography at each of these positions.

In this case, a lens different in number from those shown in FIG. 3 is fixed on the center axis of CRT5 and moves together with CRT5. The 3-step movement of photoprint or film feed positions and that of CRT/camera carriage 9 positions enable nine (9)-frame image photography per photoprint or film. The exposed photoprint or film passes along the path shown by the broken line to be stored into receiving cassette 7b via storing guide 8. Storing guide 8 and feed rollers 11 and 11' are located so as not to hinder photography. In such a configuration in which a photoprint or film is at the first photographic position, a discrimination is made by photographing media discriminator 1. Said discriminator is so constructed that the photoprint or film is put between a light emitter and a light receiver located opposite each other, thereby discriminating between said photoprint and film through receiver detection of an optical beam emitted from the emitter because the photoprint blocks light, whereas the film does not.

The light emitter would typically be an infrared emitting LED and the light receiver, a photo-transistor. The photographing condition setting device 4 selects photographic conditions suitable for a media type and for a appropriate developing processor according to the discriminating signal given by photographing media discriminator 1 and the CRT brightness signal by light receiver 6 to set them to the CRT and the camera within CRT/camera carriage 9.

It is desirable that said photographing condition setting device 4 incorporate a microprocessor. The camera within CRT/camera carriage 9 is set by exposure, while the CRT is set by brightness.

Thus, when the camera is ready to photograph an image on the CRT, a CRT image corresponding to one (1) frame is exposed onto the photoprint or film to be photographed by the camera. Eight (8)-frame image photography is made in the same manner. When nine (9)-frame photography is complete, the photoprint or film is stored in cassette 7b and then developed by an automatic processor.

Two (2) or more lenses may also be used as shown in FIG. 3 for multi-frame photography in which the CRT/camera carriage is fixed. As aforementioned, the present invention can provide a CRT photographic device which enables multi-frame photography both of transmitted light images onto conventional medical imaging film and reflected light images onto photoprint without the need for a film viewing box by automatically selecting photographic conditions appropriate to the photographic media being used, thereby avoiding photographic failure as can occur in conventional manual selection of photographic conditions.

The advantage of the CRT multiformat camera in this invention over a Polaroid camera is that it can photograph multi-frame photographs of reflected light medical images and has improved photoprint optical density of up to 2.1 when compared with Polaroid's photography of one-frame per sheet format and photograph optical density of up to 1.6. This enables reflected light images with a dynamic range nearly equal to transmitted light images on a conventional medical imaging film. The photographs produced by said CRT multiformat camera are also less expensive than Polaroid prints, and reflected light images on photoprint photographed by the CRT multiformat camera are far superior in both gradient and resolution to reflected light images on a Polaroid photograph and are equal to transmitted light images on medical imaging film. Further, photoprints can be developed, in the smae way as medical imaging film, by automatic X-ray film processors installed in most hospitals, thereby enabling new image diagnosis by the proper use of transmitted light and reflected light images at need.

Above is the description of the best form in order to implement this invention. However, a person having ordinary skill in the art to which this invention pertains can also make various modifications within the concept of this invention described in the following claims.

What is claimed is:

1. A CRT multiformat camera having a CRT display unit for showing an image and, a camera for photographing the image shown on the CRT display unit at two (2) or more frame positions on photographic media of either film or photoprint, comprising;

photographing media discriminator (1) which discriminates between photographic media and outputs a photographic media discriminating signal, and photographing condition setting device (4) which sets photographic conditions suitable for a photographic media type selected according to the discriminating signal given by said photographing media discriminator to the camera and/or the CRT display unit.

2. A CRT multiformat camera as claimed in claim 1 wherein light receiver (6) which detects CRT display brightness is further included, and the photographing condition setting device also refers to the brightness detection signal of said light receiver when setting photographic conditions.

3. A CRT multiformat camera as claimed in claim 2 wherein the photographing condition setting device sets the conditions of camera exposure and CRT display brightness.

4. A CRT multiformat camera as claimed in claim 1 wherein the camera has a single optical system which can relatively move parallel with the photographic media surface.

5. A CRT multiformat camera as claimed in claim 1 wherein the camera has two (2) or more optical systems whose relative positions are fixed with respect to the photographic media and which project a CRT display image onto two (2) or more frame positions of said photographic media.

* * * * *